United States Patent
Turkel et al.

(10) Patent No.: US 8,166,020 B2
(45) Date of Patent: Apr. 24, 2012

(54) QUERY GENERATOR

(75) Inventors: Joel Turkel, Boston, MA (US); Raghuram Venkatasubramanian, Union City, CA (US)

(73) Assignee: Oracle International Corporation, Redwood Shores, CA (US)

(*) Notice: Subject to any disclaimer, the term of this patent is extended or adjusted under 35 U.S.C. 154(b) by 38 days.

(21) Appl. No.: 11/314,343

(22) Filed: Dec. 22, 2005

(65) Prior Publication Data

US 2007/0150436 A1 Jun. 28, 2007

(51) Int. Cl.
G06F 17/30 (2006.01)
(52) U.S. Cl. ......... 707/713; 707/714; 707/759; 707/765
(58) Field of Classification Search ............... 707/1, 10, 707/100, 3, 999.002, 713, 714, 759, 765; 717/106
See application file for complete search history.

(56) References Cited

U.S. PATENT DOCUMENTS

| | | | |
|---|---|---|---|
| 6,745,180 B2 * | 6/2004 | Yamanoue | 707/734 |
| 7,110,997 B1 * | 9/2006 | Turkel et al. | 707/713 |
| 7,454,416 B2 * | 11/2008 | Zuzarte et al. | 707/999.003 |
| 7,739,262 B2 * | 6/2010 | Larson et al. | 707/713 |
| 7,747,638 B1 * | 6/2010 | Loo et al. | 707/765 |
| 7,797,307 B2 * | 9/2010 | Turkel et al. | 707/714 |
| 7,814,090 B2 * | 10/2010 | Dhamija et al. | 707/713 |
| 7,860,877 B2 * | 12/2010 | Petropoulos et al. | 707/759 |
| 7,882,121 B2 * | 2/2011 | Bruno et al. | 707/759 |
| 7,908,259 B2 * | 3/2011 | Branscome et al. | 707/705 |
| 7,917,463 B2 * | 3/2011 | Dagum et al. | 707/714 |
| 7,933,894 B2 * | 4/2011 | Friedman et al. | 707/713 |
| 7,945,575 B2 * | 5/2011 | Cushing et al. | 707/765 |
| 2003/0204499 A1 * | 10/2003 | Shahabi et al. | 707/3 |
| 2003/0208506 A1 * | 11/2003 | Greenfield et al. | 707/102 |
| 2003/0233632 A1 * | 12/2003 | Aigen et al. | 717/106 |
| 2004/0034666 A1 * | 2/2004 | Chen | 707/104.1 |
| 2004/0088158 A1 * | 5/2004 | Sheu et al. | 704/9 |
| 2004/0220911 A1 * | 11/2004 | Zuzarte et al. | 707/3 |
| 2006/0048097 A1 * | 3/2006 | Doshi | 717/106 |
| 2006/0161525 A1 * | 7/2006 | Bordawakar et al. | 707/3 |
| 2006/0218123 A1 * | 9/2006 | Chowdhuri et al. | 707/2 |
| 2006/0224564 A1 * | 10/2006 | Yu et al. | 707/2 |
| 2007/0185833 A1 * | 8/2007 | Turkel et al. | 707/3 |
| 2010/0114893 A1 * | 5/2010 | Chandhok et al. | 707/737 |
| 2010/0131490 A1 * | 5/2010 | Lamb et al. | 707/714 |
| 2010/0185643 A1 * | 7/2010 | Rao et al. | 707/759 |
| 2010/0211564 A1 * | 8/2010 | Cohen et al. | 707/722 |
| 2010/0257181 A1 * | 10/2010 | Zhou et al. | 707/747 |
| 2010/0318549 A1 * | 12/2010 | Mayr et al. | 707/759 |
| 2011/0131200 A1 * | 6/2011 | Zhou et al. | 707/714 |

* cited by examiner

*Primary Examiner* — Charles Rones
*Assistant Examiner* — Rezwanul Mahmood
(74) *Attorney, Agent, or Firm* — Murphy & King, P.C.

(57) ABSTRACT

A query generator for generating a query that returns a result set comprising data retrieved from a database and data returned by an analytic function that operates on at least a portion of the retrieved data is disclosed. The result set is arranged as a table having a plurality of rows, and the query generator is adapted to:

a) receive an input query indicating the data to be retrieved from the database, which of these data are to be operated on by the analytic function and the identity of the analytic function;

b) analyse the input query to ascertain whether it retrieves a data item or calculates an aggregation result from a plurality of data items that will be repeated across one or more rows of the result set and that is to be operated on by the analytic function; and c) if it does, modify the input query to cause the database to split the retrieved data into a number of partitions such that the data value or aggregation result is present only once in each partition; before operating on the retrieved data with the analytic function.

19 Claims, 2 Drawing Sheets

QUERY GENERATOR

This invention relates to a query generator for use in generating queries that retrieve data from a database, wherein the retrieved data are acted on by an analytic function.

Query generators, for example Discoverer® from Oracle®, are used to construct database queries which are then sent to a database for execution. A user constructs a query by selecting items from a drop-down list of items displayed on the screen. The items may represent data which are to be obtained from the database, or alternatively they may represent operations that are to be performed on these data. Once the items have been selected, the query generator then generates a query, usually in structured query language (SQL), for execution by the database.

Using Oracles® Discoverer®, an expression language may be employed to define calculations to be performed on the data. This expression language supports a class of calculations called analytic functions. Other types of functions are scalar functions which take a single row from a database table and return a single value based on the data items within that row, and aggregate functions which take multiple rows from a database table and return a single value based on the data items within those rows. Analytic functions, on the other hand, take multiple rows and return a value for each of these rows. The calculation of an analytic function requires multiple passes over the data contained in these rows.

For example, in calculating a percentage of a set of numeric data stored in multiple rows of a database table. A first pass is required over all the rows of the table to calculate the total value of all these numeric data, and then a subsequent pass is required to calculate the percentage proportion of this total contributed by each of the data items.

Analytic functions are evaluated after any aggregation functions that have been specified are performed. Examples of analytic functions are calculations of the rank, percentage and moving totals of a set of data.

For example, the following table may be created as the result of an SQL statement executed on a database:

| YEAR | REGION | SUM_SALES | SALES_RANK |
| --- | --- | --- | --- |
| 1999 | East | 100 | 1 |
| 1999 | West | 50 | 2 |
| 2000 | East | 30 | 3 |
| 2000 | West | 20 | 4 |

As can be seen, the far right column in this table indicates the rank of the SUM_SALES value for each row with respect to the values in the other rows. The partial SQL statement that generates the SALES_RANK column is:

RANK( )OVER(ORDER BY SUM_SALES DESC)

This statement indicates that the RANK analytic function should be used on the group of data defined by the SUM_SALES column and that the results should be presented in descending order (the ORDER BY . . . DESC keyword defines the order of presentation of the rows). The use of the OVER keyword indicates that the function is analytic.

However, there are certain configurations of database schemas for which a query will not return the correct result when an analytic function is computed for retrieved data. Currently, the only way of dealing with this is to detect that the result of the analytic function is potentially incorrect and omit to display the result to the user. For example, in the previous example the right hand column of the table would be left blank. This is clearly unsatisfactory.

In accordance with one aspect of the invention, there is provided a query generator for generating a query that returns a result set comprising data retrieved from a database and data returned by an analytic function that operates on at least a portion of the retrieved data, the result set being arranged as a table having a plurality of rows, wherein the query generator is adapted to:

a) receive an input query indicating the data to be retrieved from the database, which of these data are to be operated on by the analytic function and the identity of the analytic function;

b) analyse the input query to ascertain whether it retrieves a data item or calculates an aggregation result from a plurality of data items that will be repeated across one or more rows of the result set and that is to be operated on by the analytic function; and c) if it does, modify the input query to cause the database to split the retrieved data into a number of partitions such that the data value or aggregation result is present only once in each partition; before operating on the retrieved data with the analytic function.

In accordance with a second aspect of the invention, there is provided a method for generating a query that returns a result set comprising data retrieved from a database and data returned by an analytic function that operates on at least a portion of the retrieved data, the result set being arranged as a table having a plurality of rows, wherein the method comprises:

a) receiving an input query indicating the data to be retrieved from the database, which of these data are to be operated on by the analytic function and the identity of the analytic function;

b) analysing the input query to ascertain whether it retrieves a data item or calculates an aggregation result from a plurality of data items that will be repeated across one or more rows of the result set and that is to be operated on by the analytic function; and c) if it does, modifying the input query to cause the database to split the retrieved data into a number of partitions such that the data value or aggregation result is present only once in each partition; before operating on the retrieved data with the analytic function.

Hence, the invention provides a query generator and method of operation which can overcome the problems with prior art systems by analysing an input query to see if erroneous results would be produced by an analytic function, and then modifying the input query accordingly to circumvent the problem.

The input query is typically generated by a user selecting data items to be retrieved from a list of available data items, and one or more operations to be performed on those data items including the analytic function.

The input query is normally a SQL query, although it may be present in any other suitable format, such as in a set of Java classes or as an extensible markup language (XML) data structure. Similarly, the modified input query is also normally an SQL query. In this case, the database is caused to split the retrieved data into partitions using a PARTITION BY clause in the modified input query.

The aggregation result may be derived from data items stored in more than one table of the database.

Typically, the modified input query of step c) is typically passed to the database for execution.

In accordance with a third aspect of the invention, a computer program comprising computer program code means is adapted to perform the method of the second aspect of the invention when said program is run on a computer.

In accordance with a fourth aspect of the invention, a computer program product comprises broken code means stored on the computer-readable medium for performing the method of the second aspect of the invention when said program is run on a computer.

An embodiment of the invention will now be described with reference to the accompanying drawings, in which.

Figure 1:
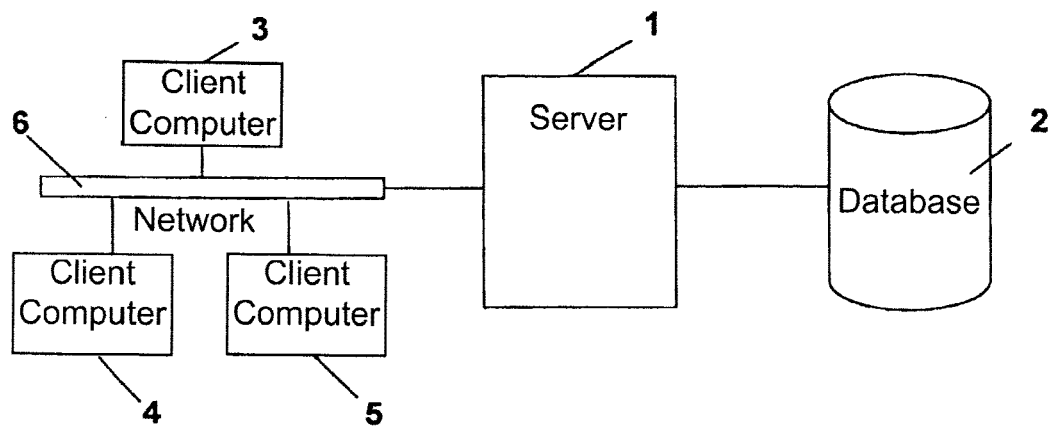
FIG. 1 shows a system on which the invention may be implemented.

FIG. 1 shows a server 1 which is connected to a database 2. The server 1 is operable to receive requests from client computers 3, 4, 5 via a network 6. This network 6 may be a local area network (LAN) or indeed it may be the Internet. Each of the client computers 3, 4, 5 runs query generator software that can construct a query in response to user input and transmit the query over network 6 to the server 1. The server 1 then executes the received query and extracts the necessary data from database 2 and performs any necessary computations on it before returning the results over the network 6 to the respective client computer 3, 4 or 5.

Figure 2:
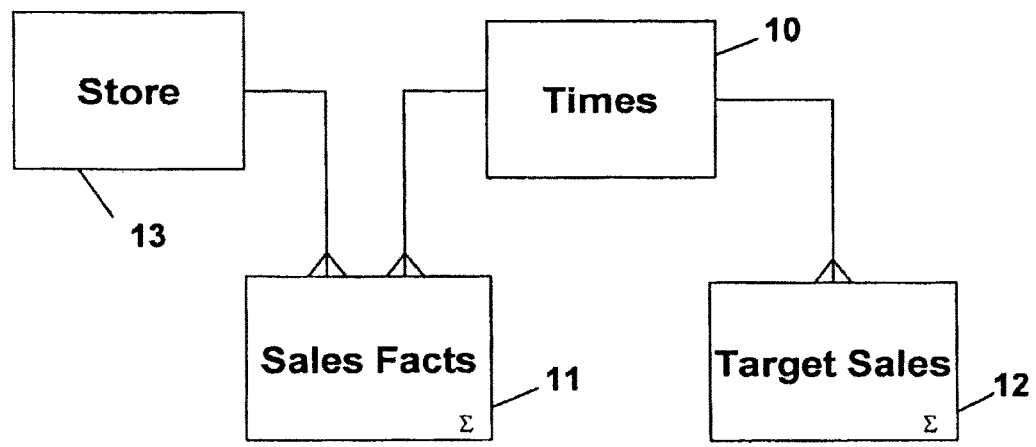
FIG. 2 shows an arrangement of tables in a database.

FIG. 2 shows a possible configuration of tables within the database 2. In this, there is a master table 10 known as the "Times" table that is joined to two detail tables 11 (known as the "Sales Facts" table) and 12 (known as the "Target Sales" table). A further table 13 (known as the "Store" table) is joined to the Sales Facts table 11 in a one to many relationship. FIG. 2 also shows the data stored in each of these tables.

One of the client computers 3, 4, 5 could be caused to generate a query that would return the year, region, sum of sales and sum of target sales from these tables. This would produce the following result set:

| YEAR | REGION | SUM_SALES | SUM_TARGET_SALES |
|------|--------|-----------|------------------|
| 1999 | East   | 100       | 250              |
| 1999 | West   | 50        | 250              |
| 2000 | East   | 30        | 50               |
| 2000 | West   | 20        | 50               |

In this example, the values of SUM_TARGET_SALES are repeated across rows for each value of REGION. Thus, if the query generated by the client computer 3, 4 or 5 is modified such that it calculated the percentage of target sales as a proportion of the total and adds this as a separate column in the table, the following results will be achieved:

The partial SQL statement that causes the generation of this right hand column and calculation of the analytic function is:

RATIO_TO_REPORT(SUM_TARGET_SALES)
OVER( )

The analytic function RATIO_TO_REPORT is used to calculate the percentage proportion of each item in the SUM_TARGET_SALES column of the total of all the values of the items in this column. As can be seen, due to the repetition of SUM_TARGET_SALES values across rows, erroneous results have been returned.

Figure 3:
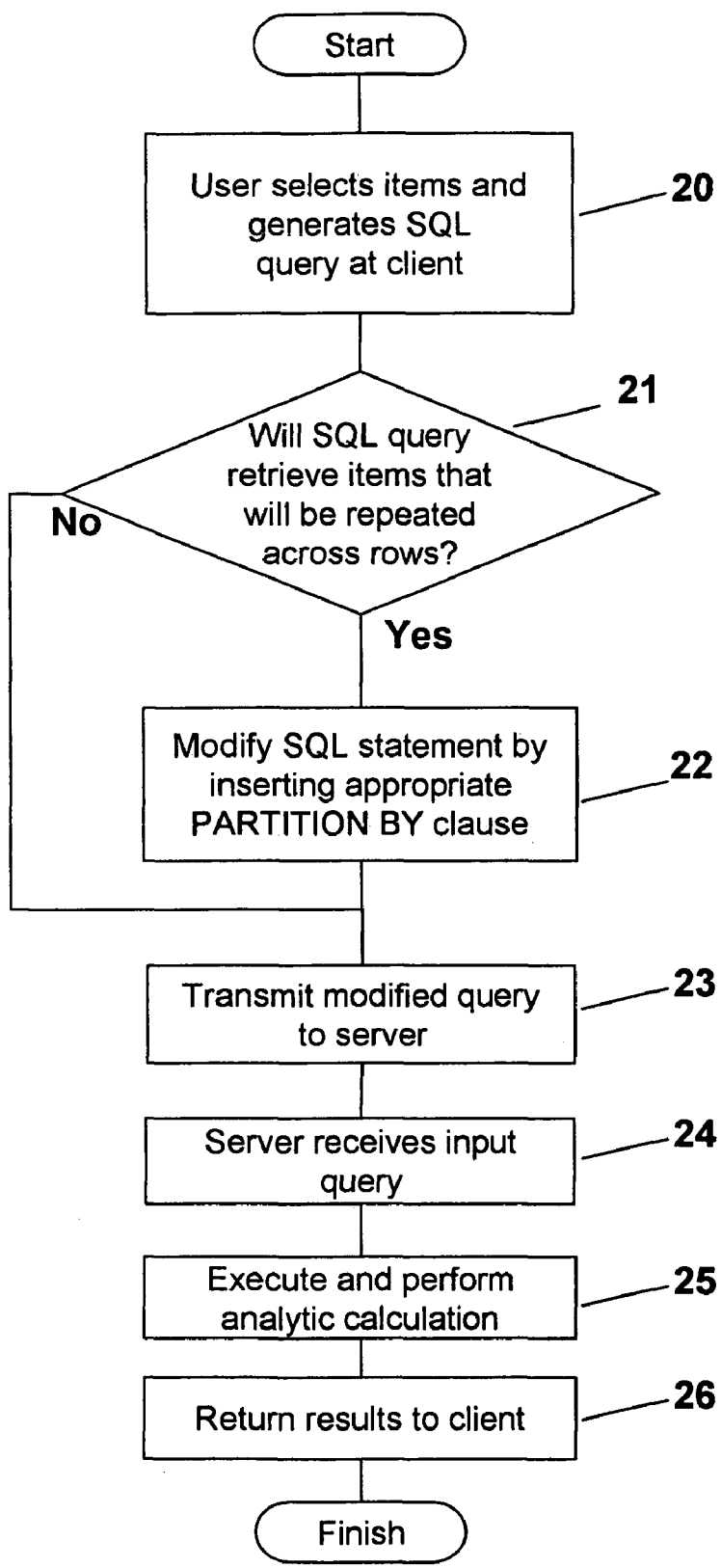
FIG. 3 shows a flow chart of the method performed by the invention.

However, the invention acts to prevent this from happening by following the method shown in FIG. 3. In step 20, a user generates an SQL query at one of the client computers 3, 4 or 5. Typically, this query will be generated using a query generation tool such as Oracle® Discoverer® where the items to be retrieved from the database along with the operations to be performed on them are selected from a list. This query is then analysed by the query tool in step 21. This analysis ascertains whether the query will retrieve a data item or calculate an aggregation result from a plurality of data items that will be repeated across one or more rows of the result set and that is to be operated on by the analytic function. This is determined by looking at the query's join configuration and the corresponding join metadata.

The query generator then modifies the SQL statement by inserting an appropriate PARTITION BY clause in step 22. The algorithm determines the GROUP BY elements over which the inputs to the analytic function will repeat and then ensures that all such elements appear in the analytic function's PARTITION BY clause. These inputs include the arguments to the analytic function and the elements of any ORDER BY clause. To find the set of elements which must appear in the PARTITION BY clause, the following procedure is performed:

1. For each input into the analytic function, determine the maximum connected join subgraph over which the input will not repeat.
2. Form a union of all the join subgraphs found in step 1.
3. Add each GROUP BY element to the analytic function's PARTITION BY clause if the element does not come from a table in the join subgraph computed in step 2.

The basic method for computing the join subgraph in step 2, which assumes that the join configuration is not circular, is:
1. Initialize an empty variable JoinSubGraph
2. Execute the function ExpandSubGraph(JoinSubGraph, VisitedJoinSet, element.getSourceTable( ), QueryJoinGraph).

Of the arguments to the ExpandSubGraph function: JoinSubGraph is the variable which will be populated by the execution of the ExpandSubGraph function to contain the join subgraph; once a join has been processed it is added to VisitedJoinSet, which therefore contains the joins that have

| YEAR | REGION | SUM_SALES | SUM_TARGET_SALES | PCT_TARGET_SALES |
|------|--------|-----------|------------------|------------------|
| 1999 | East   | 100       | 250              | 41.7%            |
| 1999 | West   | 50        | 250              | 41.7%            |
| 2000 | East   | 30        | 50               | 8.3%             |
| 2000 | West   | 20        | 50               | 8.3%             | already been processed by the ExpandSubGraph function; all joins emanating from element.getSourceTable( ) are recursively explored, and this argument therefore refers to the database table from which the ExpandSubGraph function should recurse; and QueryJoinGraph is a collection of all the joins in the subject query.

The function ExpandSubGraph performs the following actions:

For each join in the QueryJoinGraph variable that involves SourceTable and is not in VisitedJoinSet:
  a) Set variable TargetTable to the table other than the source table that is joined by the join
  b) Add the join to the VisitedJoinSet variable
  c) If join is a one-to-one join or a one-to-many join with the source table on the many side:
    i) Add join to the JoinSubGraph variable
    ii) Execute ExpandSubGraph(JoinSubGraph, VisitedJoinSet, TargetTable, QueryJoinGraph) (i.e. the ExpandSubGraph is executed recursively)

The PARTITION BY clause generated in step 22, is placed before the OVER keyword in the analytic function in accordance with the correct syntax for an analytic function. If a PARTITION BY clause is already present in the query, the elements derived in step 22 are simply added to the end of the list of existing elements.

If however, the analysis of step 21 ascertains that the query will not retrieve a data item or calculate an aggregation result from a plurality of data items that will be repeated across one or more rows of the result set and that is to be operated on by the analytic function then processing simply proceeds to step 23, thereby omitting step 22.

In step 23, the SQL query, modified in step 22 or as generated in step 20 as the case may be, is transmitted to server 1. In step 24 the server receives the query before executing it in step 25. The data are retrieved and the analytic function performed in step 26, before the results are returned over network 6 to the originating client computer 3, 4 or 5.

For example, in the previous case where the following SQL statement was used to define the analytic calculation:

RATIO_TO_REPORT(SUM_TARGET_SALES)
        OVER( )

This would be detected by the invention during the analysis of step 21 and replaced in step 22 by the following statement:

RATIO_TO_REPORT(SUM_TARGET_SALES)
        OVER(PARTITION BY REGION)

The insertion of the PARTITION BY clause splits the rows of data into sets based on the REGION value of the rows. Each set has only one value of REGION and there is only one set for each value of REGION. The RATIO_TO_REPORT analytic function is then computed independently for each of these sets.

Thus, when executed in step 25, this statement would generate the following correct result set:

As can be seen, the PARTITION BY clause causes the retrieved data to be grouped such that the aggregation value of SUM_TARGET_SALES is present only once in each group thereby allowing the correct percentage calculation to be achieved.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

The invention claimed is:

1. A query generator for generating a query that returns a result set comprising data retrieved from a database and data returned by an analytic function that operates on at least a portion of the retrieved data, the result set being arranged as a table having a plurality of rows, wherein the query generator comprises a processor to execute computer program instructions, a memory to store computer program instructions executable by the processor and data for processing by the processor, and computer program instructions stored in the memory and executable to configure the query generator to:
  a) receive, at the query generator, an input query indicating the data for retrieval from the database, which of these indicated data are for operation on by the analytic function, and the identity of the analytic function;
  b) analyze, at the query generator, the input query to ascertain whether erroneous results would be produced by the analytic function based on a join configuration and corresponding join metadata of the query because the input query retrieves a data item that will be repeated across one or more rows of the result set and that is operated on by the analytic function, or because the input query calculates an aggregation result from a plurality of data items, the aggregation result that will be repeated across one or more rows of the result set and that is operated on by the analytic function; and
  c) modify, at the query generator, the input query by inserting a partition clause into the input query to form a modified query that includes at least one more partition clause than the input query, to cause the database to split the retrieved data into a number of partitions such that the data item or aggregation result is present only once in each partition, before operating on the retrieved data with the analytic function, when erroneous results would be produced by the analytic function because the input query retrieves a data item that will be repeated across one or more rows of the result set and that is operated on by the analytic function, or because the input query calculates an aggregation result from a plu-

| YEAR | REGION | SUM_SALES | SUM_TARGET_SALES | PCT_TARGET_SALES |
| --- | --- | --- | --- | --- |
| 1999 | East | 100 | 250 | 83.3% |
| 1999 | West | 50 | 250 | 83.3% |
| 2000 | East | 30 | 50 | 16.7% |
| 2000 | West | 20 | 50 | 16.7% | rality of data items, the aggregation result that will be repeated across one or more rows of the result set and that is operated on by the analytic function.

2. The query generator according to claim 1, wherein the input query is generated by a user selecting data items retrieved from a list of available data items, and one or more operations performed on those data items including the analytic function.

3. The query generator according to claim 1, wherein the input query is a structured query language (SQL) query.

4. The query generator according to claim 1, wherein the input query is defined by one or more Java classes.

5. The query generator according to claim 1, wherein the input query is defined by an extensible markup language (XML) data structure.

6. The query generator according to claim 1, wherein the modified input query is an SQL query.

7. The query generator according to claim 1, wherein the aggregation result is derived from data items stored in more than one table of the database.

8. The query generator according to claim 1, wherein the query generator is further configured to pass the modified input query of step (c) to the database for execution.

9. A method implemented in a computer system comprising a processor to execute computer program instructions, a memory to store computer program instructions executable by the processor and data for processing by the processor, and computer program instructions stored in the memory and executable to perform the method, the method for generating a query that returns a result set comprising data retrieved from a database and data returned by an analytic function that operates on at least a portion of the retrieved data, the result set being arranged as a table having a plurality of rows, wherein the method comprises:

a) receiving, in the computer system, an input query indicating the data for retrieval from the database, which of these indicated data are for operation on by the analytic function, and the identity of the analytic function;

b) analyzing, in the computer system, the input query to ascertain whether erroneous results would be produced by the analytic function based on a join configuration and corresponding join metadata of the query because the input query retrieves a data item that will be repeated across one or more rows of the result set and that is operated on by the analytic function, or because the input query calculates an aggregation result from a plurality of data items, the aggregation result that will be repeated across one or more rows of the result set and that is operated on by the analytic function; and c) modifying, in the computer system, the input query by inserting a partition clause into the input query to form a modified query that includes at least one more partition clause than the input query, to cause the database to split the retrieved data into a number of partitions such that the data item or aggregation result is present only once in each partition, before operating on the retrieved data with the analytic function, when erroneous results would be produced by the analytic function because the input query retrieves a data item that will be repeated across one or more rows of the result set and that is operated on by the analytic function, or because the input query calculates an aggregation result from a plurality of data items, the aggregation result that will be repeated across one or more rows of the result set and that is operated on by the analytic function.

10. The method according to claim 9, wherein the input query is generated by a user selecting data items retrieved from a list of available data items, and one or more operations performed on those data items including the analytic function.

11. The method according to claim 9, wherein the input query is a structured query language (SQL) query.

12. The method according to claim 9, wherein the input query is defined by one or more Java classes.

13. The method according to claim 9, wherein the input query is defined by an extensible markup language (XML) data structure.

14. The method according to claim 9, wherein the modified input query is an SQL query.

15. The method according to claim 9, wherein the aggregation result is derived from data items stored in more than one table of the database.

16. The method according to claim 9, wherein the method further comprises passing the modified input query of step (c) to the database for execution.

17. A computer program product comprising a computer readable storage medium and computer program code stored on the computer readable storage medium and executable by a processor to perform the method of claim 9 when said program is executed by the processor.

18. A computer program product comprising program code stored on a computer readable recordable-type media for performing the method of claim 9 when said program is run on a computer.

19. A query generator for generating a query that returns a result set comprising data retrieved from a database and data returned by an analytic function that operates on at least a portion of the retrieved data wherein the query generator comprises a processor to execute computer program instructions, a memory to store computer program instructions executable by the processor and data for processing processed by the processor, and computer program instructions stored in the memory and executable to adapt the query generator to:

a) receive, at the query generator, an input query indicating the data for retrieval from the database, which of these indicated data are for operation on by the analytic function, and the identity of the analytic function;

b) analyze, at the query generator, the input query to ascertain whether erroneous results would be produced by the analytic function based on a join configuration and corresponding join metadata of the query because the input query retrieves a data item that will be repeated across one or more rows of the result set and that is operated on by the analytic function, or because the input query calculates an aggregation result from a plurality of data items, the aggregation result that will be repeated across one or more rows of the result set and that is operated on by the analytic function; and c) modify, at the query generator, the input query by inserting a partition clause into the input query to form a modified query that includes at least one more partition clause than the input query, to cause the database to split the retrieved data into a number of partitions such that the data item or aggregation result is present only once in each partition, before operating on the retrieved data with the analytic function, when erroneous results would be produced by the analytic function because the input query retrieves a data item that will be repeated across one or more rows of the result set and that is operated on by the analytic function, or because the input query calculates an aggregation result from a plurality of data items, the aggregation result that will be repeated across one or more rows of the result set and that is operated on by the analytic function.

* * * * *

UNITED STATES PATENT AND TRADEMARK OFFICE
CERTIFICATE OF CORRECTION

PATENT NO. : 8,166,020 B2  Page 1 of 1
APPLICATION NO. : 11/314343
DATED : April 24, 2012
INVENTOR(S) : Turkel et al.

It is certified that error appears in the above-identified patent and that said Letters Patent is hereby corrected as shown below:

In column 1, line 17, delete "Oracles®" and insert -- Oracle® --, therefor.

Signed and Sealed this
Seventh Day of August, 2012

David J. Kappos
*Director of the United States Patent and Trademark Office*